United States Patent [19]

Itoh et al.

[11] Patent Number: 4,588,936
[45] Date of Patent: May 13, 1986

[54] DIGITALIZED POSITION CONTROL FOR A D.C. MOTOR

[75] Inventors: Hiromu Itoh, Nara; Zempei Tani, Tondabayashi; Kenji Hachimura, Nara, all of Japan

[73] Assignee: Sharp Kabushiki Kaisha, Osaka, Japan

[21] Appl. No.: 615,750

[22] Filed: May 31, 1984

[30] Foreign Application Priority Data

Jun. 2, 1983 [JP] Japan .................................. 58-99231
Jun. 6, 1983 [JP] Japan ................................ 58-101225

[51] Int. Cl.⁴ .......................................... G05B 11/18
[52] U.S. Cl. ..................... 318/594; 318/602; 318/603; 318/599
[58] Field of Search ............... 318/592, 594, 636, 604, 318/602, 615, 599

[56] References Cited

U.S. PATENT DOCUMENTS

| | | | |
|---|---|---|---|
| 3,686,547 | 8/1972 | Kelling | 318/608 X |
| 3,786,333 | 1/1974 | Sommeria | 318/606 |
| 3,932,796 | 1/1976 | Kreithen et al. | 318/604 X |
| 4,021,714 | 5/1977 | Jones | 318/595 |
| 4,221,998 | 9/1980 | Haught | 318/608 |
| 4,355,273 | 10/1982 | DuVall | 318/592 X |
| 4,423,365 | 12/1983 | Turner | 318/615 X |
| 4,429,267 | 1/1984 | Veale | 318/594 |
| 4,486,693 | 12/1984 | Hamati et al. | 318/615 X |
| 4,511,830 | 4/1985 | Yamada et al. | 318/636 X |

Primary Examiner—B. Dobeck
Attorney, Agent, or Firm—Birch, Stewart, Kolasch & Birch

[57] ABSTRACT

A D.C. motor position control system operates either in the motor speed detection mode or in the motor position detection mode. A rotary encoder develops an approximate sinusoidal position indicating analog signal in response to the rotation of the D.C. motor. A waveform shaping circuit receives the approximate sinusoidal position indicating analog signal and develops a rectangular position indicating digital signal to a phase comparator which compares the phase of the rectangular position indicating digital signal with the phase of a speed instructing pulse signal so as to control the motor speed in a phase-locked-loop (PLL) manner in the motor speed detection mode. A slice level determination circuit divides the voltage level of the approximate sinusoidal position indicating analog signal into 16 (sixteen) degrees to obtain a sliced position indicating digital signal which is used to control the motor position in the motor position detection mode.

5 Claims, 14 Drawing Figures

FIG. 5
(SLICE LEVEL DETERMINATION CIRCUIT -32-)

DIGITALIZED POSITION CONTROL FOR A D.C. MOTOR

BACKGROUND AND SUMMARY OF THE INVENTION

The present invention relates to a position control system in a D.C. motor.

In order to precisely control the position in a D.C. motor, the D.C. motor is generally controlled in two modes. The first mode is the speed detection mode wherein the rotating speed of the motor is controlled so that the motor rotates to a desired position at a fast speed. The second mode is the position detection mode, which is conducted after the completion of the speed detection mode. In the position detection mode, the motor position is precisely controlled so that the motor stops at the desired position.

In the conventional system, the speed detection mode and the position detection mode are controlled in the analog fashion. Therefore, the conventional system is not suited for the LSI technique. Furthermore, in the conventional system, the motor speed control in the speed detection mode is conducted by the frequency control method. The frequency control method inevitably produces the steady-state deviation between the instructed rotating speed and the actual rotating speed of the D.C. motor. The steady-state deviation varies depending on the load connected to the D.C. motors. Thus, the conventional system can not ensure a stable oeration when the load connected to the D.C. motor varies.

Accordingly, an object of the present invention is to digitalize a control circuit for a position control system in a D.C. motor.

Another object of the present invention is to provide a D.C. motor position control system which precisely controls the position of the D.C. motor and stops the D.C. motor at a desired position.

Still another object of the present invention is to provide a D.C. motor position control system which ensures a stable operation even when the load connected to the D.C. motor varies.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a rotary encoder is associated with a D.C. motor so as to develop an approximate sinusoidal position indicating, analog signal in response to the rotation of the D.C. motor. The approximate sinusoidal position indicating, analog signal is introduced into a slice level determination circuit which develops two sliced position indicating, digital signals to a main control circuit. The following system is digitally controlled with reference to the sliced position indicating, digital signals.

In a preferred form, a phase-locked-loop (PLL) control is employed in the speed detection mode. The phase-locked-loop (PLL) control does not produce the steady-state deviation between the actual rotating speed of the D.C. motor and the instructed speed. Therefore, an accurate speed control is achieved even when the load connected to the D.C. motor varies.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 1:
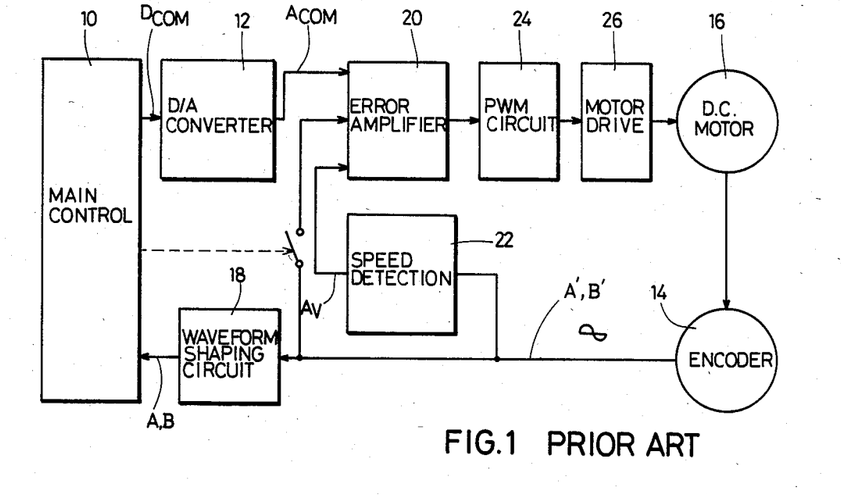
FIG. 1 is a block diagram of a D.C. motor position control system of the prior art.

In order to facilitate a complete understanding of the present invention, the conventional D.C. motor position control system will be first described with reference to FIG. 1.

The D.C. motor position control system generally operates in the speed detection mode, wherein the motor speed is controlled, and the position detection mode, wherein the D.C. motor position is accurately controlled so as to hold the D.C. motor at the target position. The speed detection mode ensures a high speed rotation of the D.C. motor, and the position detection mode ensures a precise positioning of the D.C. motor.

The conventional D.C. motor position control system includes a main control circuit 10, implemented by a microprocessor, which develops a speed instruction, digital signal $D_{COM}$ to a digital-to-analog converter 12. A rotary encoder 14 is associated with a D.C. motor 16 so as to develop an approximate sinusoidal position indicating, analog signal A', B' in response to the rotation of the D.C. motor 16. The approximate sinusoidal position indicating, analog signal A', B' is applied to a waveform shaping circuit 18 which functions to digitalize the approximate sinusoidal position indicating, analog signal A', B' so as to obtain a rectangular position indicating, digital signal A, B. The thus obtained rectangular position indicating, digital signal A, B is applied to the main control circuit 10. The main control circuit 10 calculates the system speed in accordance with the rectangular position indicating, digital signal A, B to update the speed instruction, digital signal $D_{COM}$ of predetermined bits. The digital-to-analog converter 12 develops a speed instruction, analog signal $A_{COM}$ to an error amplifier 20. The approximate sinusoidal position indicating, analog signal A', B' is further applied to a speed detection circuit 22, which develops a speed indicating, analog signal $A_V$ in accordance with the frequency of the approximate sinusoidal position indicating, analog signal A', B'. The speed indicating, analog signal $A_V$ functions as a feedback signal, and is applied to one input terminal of the error amplifier 20. The error amplifier 20 develops an analog error signal $A_{ER}$ to a pulse width modulation (PWM) circuit 24, which applies a control signal to a motor drive circuit 26.

Now assume that the D.C. motor 16 is in the stationary condition, and an instruction is applied to the system to place the D.C. motor 16 at a desired position. The system first operates in the open-loop mode because the feedback signal is not applied from the speed detection circuit 22 at the initial state. Accordingly, the motor drive circuit 26 supplies the maximum current to the D.C. motor 16 (see FIGS. 2(A) and 2(B), from T1 to T2). When the rotating speed of the D.C. motor 16 reaches the maximum speed at the time T2, the system functions to cut the speed instruction signal $D_{COM}(A_{COM})$ from the main control circuit 10 so as to reduce the accelerating torque. Therefore, the D.C. motor 16 is controlled in the closed-loop mode so that the D.C. motor 16 continues to rotate at the maximum speed.

Figures 2A, 2B:
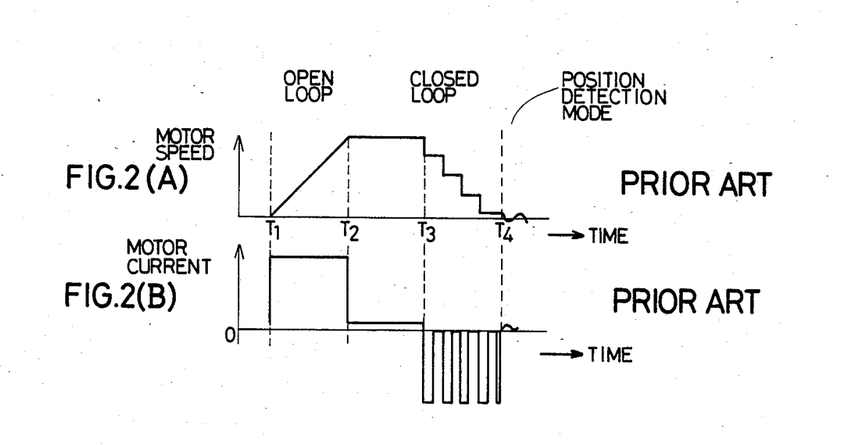
FIGS. 2(A) and 2(B) are charts for explaining an operational mode of the conventional control system of FIG. 1.

When the current position of the D.C. motor 16 becomes near the target position, the main control circuit 10 reduces the speed value of the speed instruction signal $D_{COM}(A_{COM})$ (T3 in FIGS. 2(A) and 2(B)). The motor drive circuit 26 supplies the current of the opposite direction to the D.C. motor 16 in order to brake the D.C. motor 16. The braking force is progressively applied to the D.C. motor 16, and the D.C. motor 16 reaches the minimum speed (T4 in FIGS. 2(A) and 2(B)).

Thereafter, the system operation is shifted to the position detection mode in order to precisely position the D.C. motor 16 at the target position. In the position detection mode, the zero cross point of the approximate sinusoidal position indicating, analog signal A' (or B') is utilized to control the system operation. More specifically, the approximate sinusoidal position indicating, analog signal A' (or B') is introduced into the error amplifier 20 so as to form a high-gain feedback loop in connection with the position of the D.C. motor 16. The D.C. motor 16 holds the desired position by means of the electrical detent force thereof.

As discussed above, in the conventional system, the position control is conducted in an analog fashion. That is, the approximate sinusoidal position indicating, analog signal A' (or B') is applied to the error amplifier 20 in the position detection mode to precisely control the position of the D.C. motor 16.

Furthermore, the motor speed in the speed detection mode is controlled by the frequency control method. That is, the two approximate sinusoidal position indicating, analog signal A' and B' (which have the phase difference of 90° from each other) is applied to the speed detection circuit 22. The speed detection circuit 22 develops the speed indicating, analog signal $A_V$ to the error amplifier 20. The rotating speed of the D.C. motor 16 is controlled by comparing the voltage level of the speed indicating, analog signal $A_V$ and the speed instructing, analog signal $A_{COM}$ at the error amplifier 20.

The pulse width modulation (PWM) circuit 24 is interposed between the error amplifier 20 and the motor drive circuit 26 so as to convert the analog error signal $A_{ER}$ into the pulse signal, thereby minimizing the power loss at the motor drive circuit 26.

The frequency control method of the prior art inevitably produces the steady-state deviation between the instructed motor speed and the actual rotating speed of the D.C. motor. The steady-state deviation varies depending on the load connected to the motor. Therefore, the conventional system can not ensure a stable operation when the load connected to the motor varies.

Figure 3:
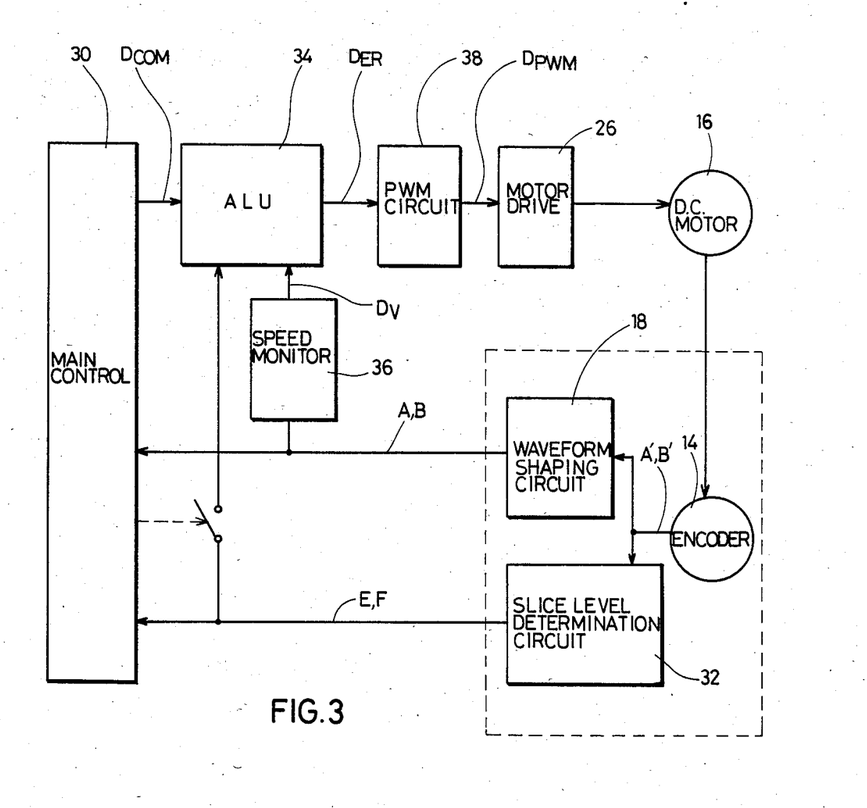
FIG. 3 is block diagram of an embodiment of a D.C. motor position control system of the present invention.

FIG. 3 shows an embodiment of the D.C. motor position control system of the present invention. Like elements corresponding to those of FIG. 1 are indicated by like numerals. The control system of the present invention operates in a digital manner both in the speed detection mode and in the position detection mode.

A main control circuit 30, implemented with a microprocessor, receives the rectangular position indicating, digital signal A, B from the waveform shaping circuit 18, and a sliced position indicating, digital signal E, F from a slice level determination circuit 32. The construction of the slice level determination circuit 32 will be described later with reference to FIG. 5. The main control circuit 30 develops the speed instruction, digital signal $D_{COM}$, which is applied to an arithmetic and logic unit (ALU) 34. An essential part of the arithmetic and logic unit (ALU) 34 will be described later in detail with reference to FIG. 6. The rectangular position indicating, digital signal A, B developed from the waveform shaping circuit 18 is further applied to a speed monitoring circuit 36. The speed monitoring circuit 36 detects the period of the rectangular position indicating, digital signal A, B in a digital fashion, and develops a speed indicating, digital code signal $D_V$.

In the speed detection mode, the speed instruction, digital signal $D_{COM}$ and the speed indicating, digital code signal $D_V$ are applied to the arithmetic and logic unit (ALU) 34. The arithmetic and logic unit (ALU) 34 compares the two signals, and develops a digitally coded error signal $D_{ER}$. The digitally coded error signal $D_{ER}$ is applied to the motor drive circuit 26 via a pulse width modulation (PWM) circuit 38. The pulse width modulation (PWM) circuit 38 operates as an interface functioning to vary the duty cycle of the drive signal to be applied to the D.C. motor drive circuit 26 in response to the digitally coded error signal $D_{ER}$.

Figure 4:
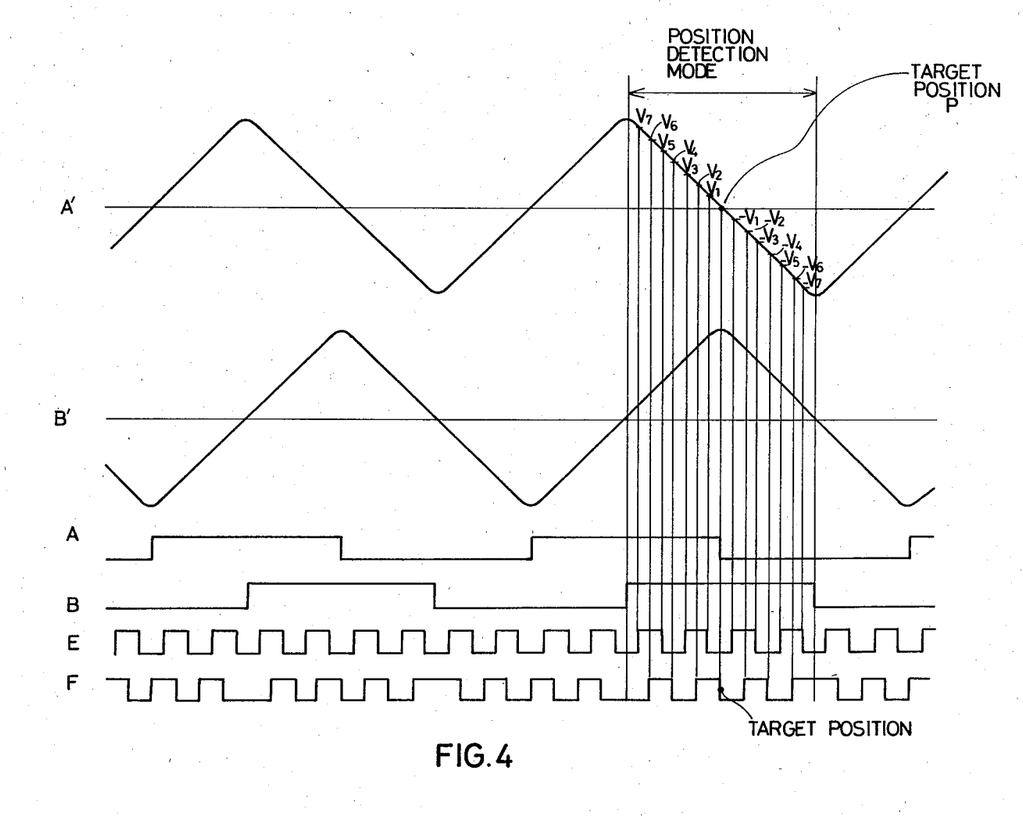
FIG. 4 is a waveform chart showing various signals occurring within the embodiment of FIG. 3.

When the motor position becomes close to the target position, the operation is changed to the position detection mode. In the position detection mode, the sliced position indicating, digital signal E, F is applied to the main control circuit 30, and the arithmetic and logic unit (ALU) 34 to control the system operation. FIG. 34 shows the relationship between the approximate sinusoidal position indicating, analog signal A', B', the rectangular position indicating, digital signal A, B, and the sliced position indicating, digital signal E, F. The sliced position indicating, digital signal E, F is obtained by detecting the voltage level of one of the approximate sinusoidal position indicating, analog signal A' and B'.

Figure 5:
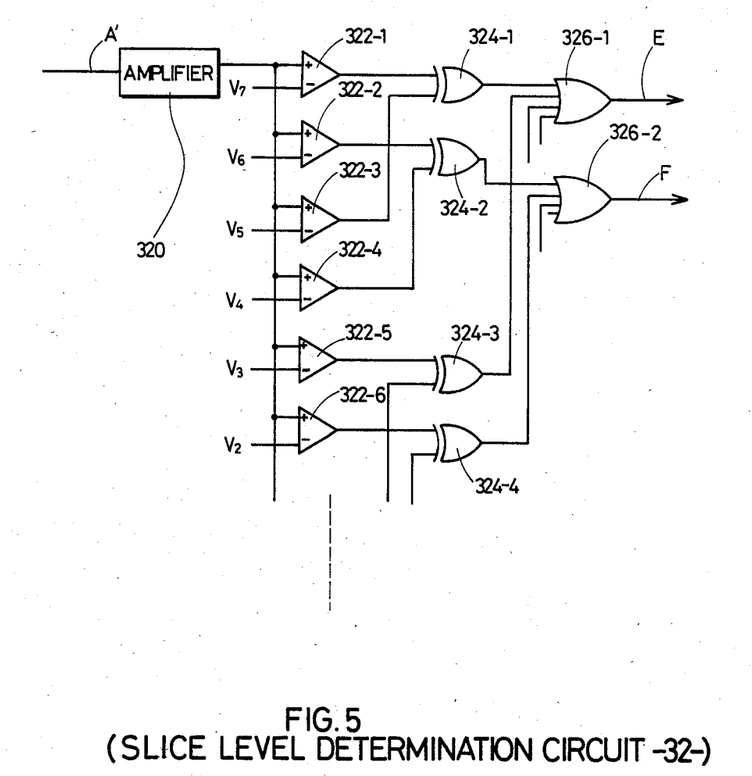
FIG. 5 is a block diagram of a slice level determination circuit included in the embodiment of FIG. 3.

In this example, the approximate sinusoidal position indicating, analog signal A' is used because the target position P is determined by the approximate sinusoidal position indicating, analog signal A'. The sliced position indicating, digital signal E, F have the phase difference from each other so that the direction of the motor rotation can be detected in the position detection mode by monitoring the sliced position indicating, digital signal E, F. FIG. 5 shows an example of the slice level determination circuit 32. The approximate sinusoidal position indicating, analog signal A' is introduced into an amplifier 320. An output signal of the amplifier 320 is introduced into 15 (fifteen) voltage comparators 322-1 through 322-15 in a parallel fashion. The first voltage comparator 322-1 receives a first reference voltage $V_7$. The second voltage comparator 322-2 receives a second reference voltage $V_6$. In a same manner the last voltage comparator 322-15 receives a fifteenth reference voltage $-V_7$. That is, the voltage level of the approximate sinusoidal position indicating, analog signal A' is detected by the 15 (fifteen) voltage comparators 322-1 through 322-15, and the voltage level is divided into 16 (sixteen) levels. That is, the first voltage comparator 322-1 detects whether the voltage level of the output signal of the amplifier 320 is higher than the first reference voltage $V_7$. The second voltage comparator 322-2 detects whether the voltage level of the output signal of the amplifier 320 is higher than the second reference voltage $V_6$. Similarly, the last voltage comparator 322-15 detects whether the voltage level of the output signal of the amplifier 320 is higher than the last reference voltage $-V_7$. Detection outputs of the first and third voltage comparators 322-1 and 322-3 are applied to a first exclusive-OR gate 324-1. The detection outputs of the second and fourth voltage comparators 322-2 and 322-4 are applied to a second excusive-OR gate 324-2. Similarly, detection outputs of the thirteenth and fifteenth voltage comparators 322-13 and 322-15 are applied to a seventh exclusive-OR gate 324-7. The output signal of the fourteenth voltage comparator 322-14 is applied to one input terminal of the last exclusive OR gate 324-8. The other input terminal of the last exclusive-OR gate 324-8 receives a signal which always bears the logic high. A first OR gate 326-1 receives output signals of the odd-number exclusive OR gates 324-1, 324-3, 324-5 and 324-7. An output signal of the first OR gate 326-1 operates as the sliced position indicating, digital signal E. A second OR gate 326-2 receives output signals of the even-number exclusive-OR gates 324-2, 324-4, 324-6 and 324-8. An output signal of the second OR gate 326-2 functions as the sliced position indicating, digital signal F.

The thus formed sliced position indicating, digital signal E, F is introduced into the arithmetic and logic unit (ALU) 34 in the position detection mode. The arithmetic and logic unit (ALU) 34 counts (up/down) the sliced position indicating, digital signal E, F to determine the separation of the current motor position from the target position P. In accordance with the degree of the separation, the returning force to the target position P is controlled.

Figure 6:
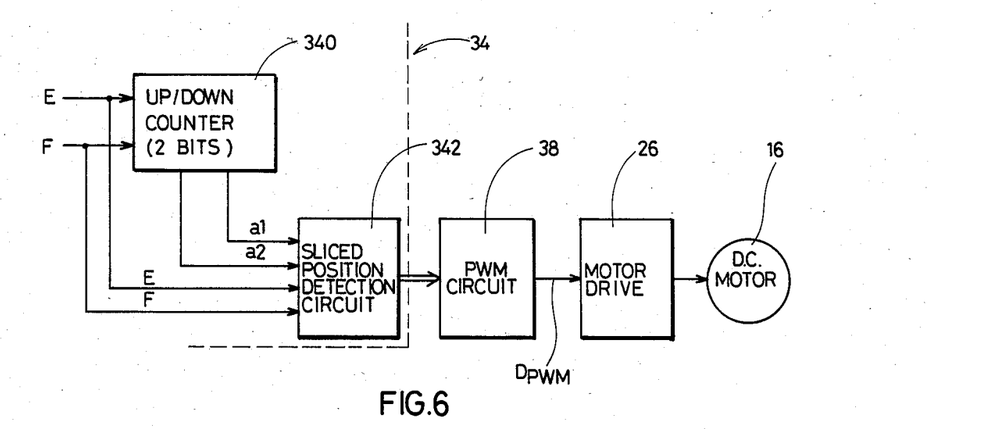
FIG. 6 is a block diagram of an essential part of an arithmetic and logic unit included in the embodiment of FIG. 3.

FIG. 6 shows an essential part of the arithmetic and logic unit (ALU) 34 in the position detection mode. Like elements corresponding to those of FIG. 3 are indicated by like numerals.

The arithmetic and logic unit (ALU) 34 includes an up/down counter 340. The up/down counter 340 is the two-bits construction, and receives the sliced position indicating, digital signal E, F in order to determine the position of the D.C. motor 16 and the rotating direction of the D.C. motor 16. The up/down count operation is controlled by checking the phase relationship between the sliced position indicating, digital signal E, F. The count operation is conducted in response to the trailing edge of the sliced position indicating, digital signal F. The count output is two bits construction ($a_1$ and $a_2$) as shows in FIG. 7(C). The count output $a_1$, $a_2$ is applied to a sliced position detection circuit 342 which also receives the sliced position indicating, digital signal E, F. The sliced position detection circuit 342 develops a control signal to the pulse width modulation (PWM) circuit 38 for stopping the rotation of the D.C. motor 16 under the following logic condition.

(1) The count output $a_1$, $a_2$ of the up/down counter 340 is (0, 1), and the logic value of the sliced position indicating, digital signal E, F is (0, 0), or (2) The count output $a_1$, $a_2$ of the up/down counter 340 is (1, 0), and the logic value of the sliced position indicating, digital signal E, F is (0, 1).

Figures 7A, 7B, 7C:
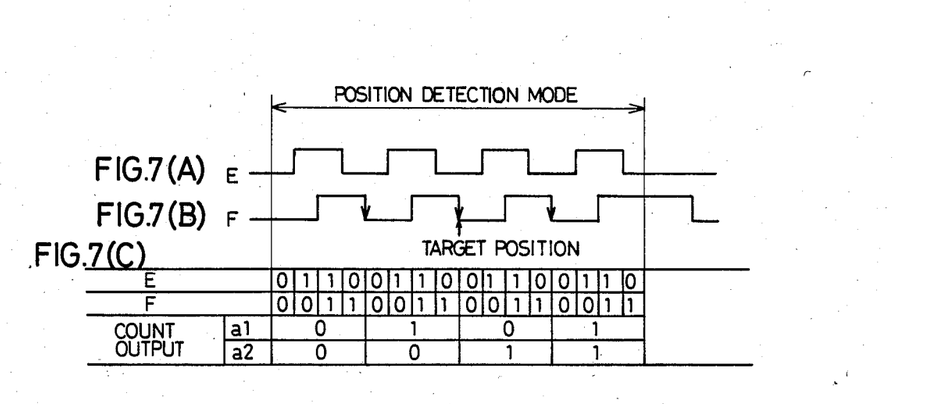
FIGS. 7(A) and 7(B) are waveform charts showing signals occurring within the arithmetic and logic unit of FIG. 6.
FIG. 7(C) is a logic table for explaining an operational mode of the arithmetic and logic unit of FIG. 6.

It will be clear from FIGS. 7(A) through 7(C) that the returning force is controllable with different eight degrees in the positive and negative directions, respectively. In this way, the D.C. motor 16 is precisely stopped at the target position P.

Figure 8:
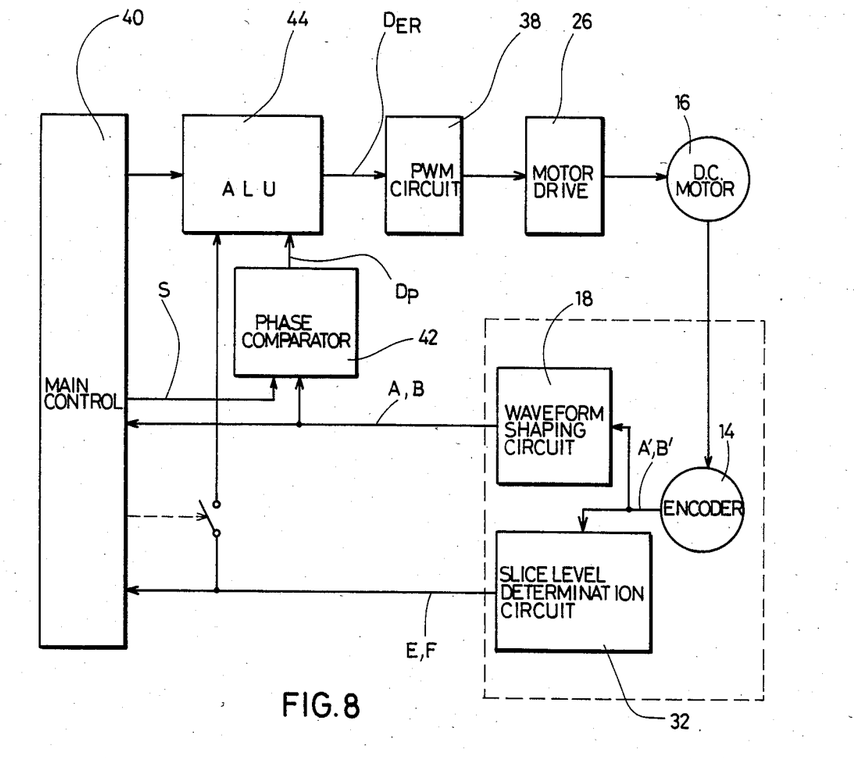
FIG. 8 is a block diagram of another embodiment of a D.C. motor position control system of the present invention.

FIG. 8 shows another embodiment of a D.C. motor position control system of the present invention, wherein the motor speed control in the speed detection mode is achieved by the phase-locked-loop (PLL) control. The position control in the position detection mode is conducted in a same manner as the embodiment of FIG. 3. Like elements corresponding to those of FIG. 3 are indicated by like numerals.

A main control circuit 40, implemented with a microprocessor, receives the rectangular position indicating, digital signal A, B from the waveform shaping circuit 18, and develops a speed instructing pulse signal S with a predetermined period (frequency) in accordance with the position information derived from the rectangular position indicating, digital signal A, B. A phase comparator 42 compares the phase of the speed instructing pulse signal S with the phase of the rectangular position indicating, digital signal A or B. The phase comparator 42 develops a phase difference signal $D_P$ (digital code signal) in accordance with the phase difference between the speed instructing pulse signal S and the rectangular position indicating, digital signal A or B. The phase difference signal $D_P$ is applied to an arithmetic and logic unit (ALU) 44, which develops the digitally coded error signal $D_{ER}$ in accordance with the phase difference signal $D_P$. The following operation is similar to that described with reference to FIG. 3. That is, in the embodiment of FIG. 8, the motor speed control in the speed detection mode is achieved in the phase-locked-loop (PLL) manner, wherein the phase of the rectangular position indicating, digital signal A or B is compared with the phase of the speed instructing pulse signal S. The PLL control never produces the steady-state deviation between the actual speed of the D.C. motor 16 and the instructed motor speed.

Although in the embodiment of FIG. 8 the rectangular position indicating, digital signal A or B is used to perform the PLL control, the PLL control can be performed through the use of the sliced position indicating digital signal E.

Figure 9:
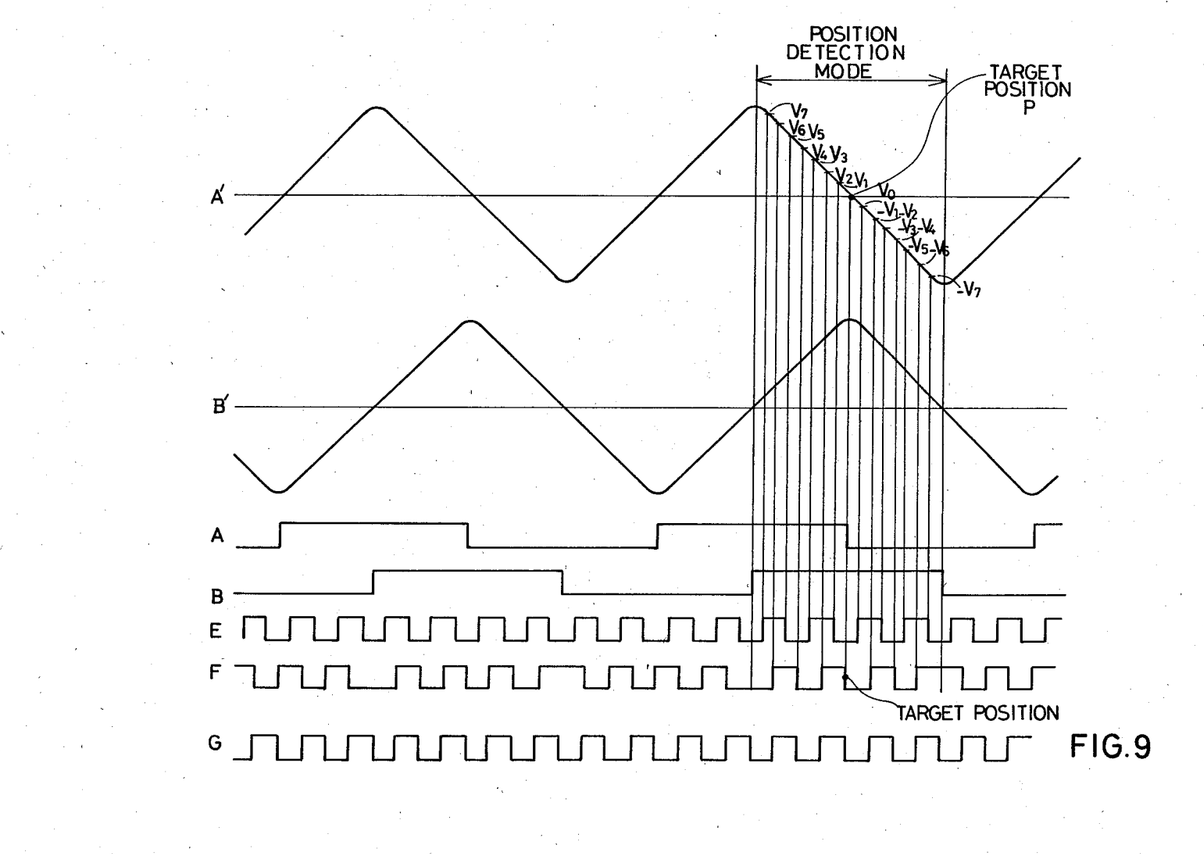
FIG. 9 is a waveform chart showing various signals occurring within still another embodiment of a D.C. motor position control system of the present invention.

The sliced position indicating, digital signal F is not suited for the PLL control because the sliced position indicating, digital signal F has a different pulse width at the peak of the approximate sinusoidal position indicating, analog signal A'. FIG. 9 shows another sliced position indicating, digital signal G which is obtained from the approximate sinusoidal position indicating, analog signal B'. The sliced position indicating, digital signal G is effective to perform the PLL control in the speed detection mode. The sliced position indicating, digital signal G can be formed by a slice level determination circuit having a similar construction as the slice level determination circuit 32 shown in FIG. 5, but having an input terminal receiving the approximate sinusoidal position indicating, analog signal B'.

Figure 10:
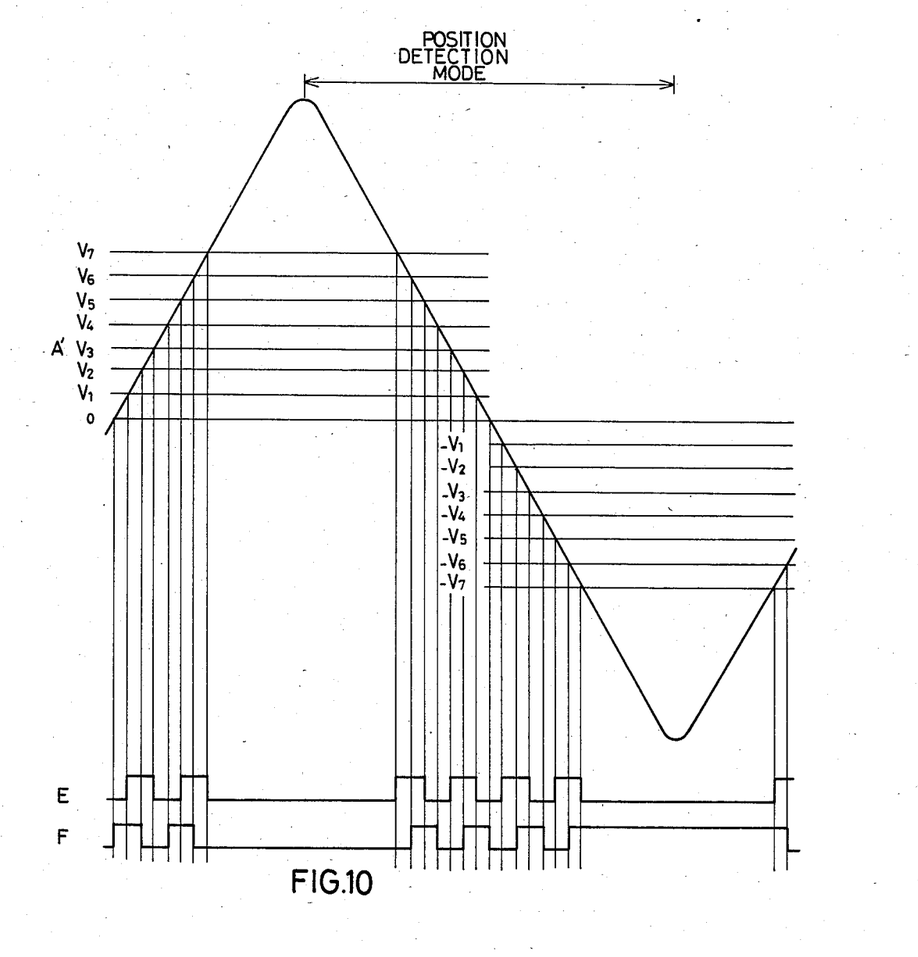
FIG. 10 is a waveform chart for explaining yet another embodiment of a D.C. motor position control system of the present invention.

The reference voltages $V_7$ through $-V_7$ should not be fixed to the foregoing embodiments. FIG. 10 shows another example of the relationship between the voltage level of the approximate sinusoidal position indicating, analog signal A' and the levels of the reference voltages $V_7$ through $-V_7$ which are applied to the voltage comparators 322-1 through 322-15 in the slice level determination circuit 32 shown in FIG. 5. By selecting the reference voltages $V_7$ through $-V_7$ as shown in FIG. 10, a further accurate control is ensured because the slice interval becomes short near the target position P. Moreover, the counting operation is ensured because the sliced position indicating, digital signal E, F does not change the logic value near the peak position of the approximate sinusoidal position indicating, analog signal A'. Furthermore, the system operation is ensured because an initializing period can be provided near the peak position of the approximate sinusoidal position indicating, analog signal A'.

Figure 11:
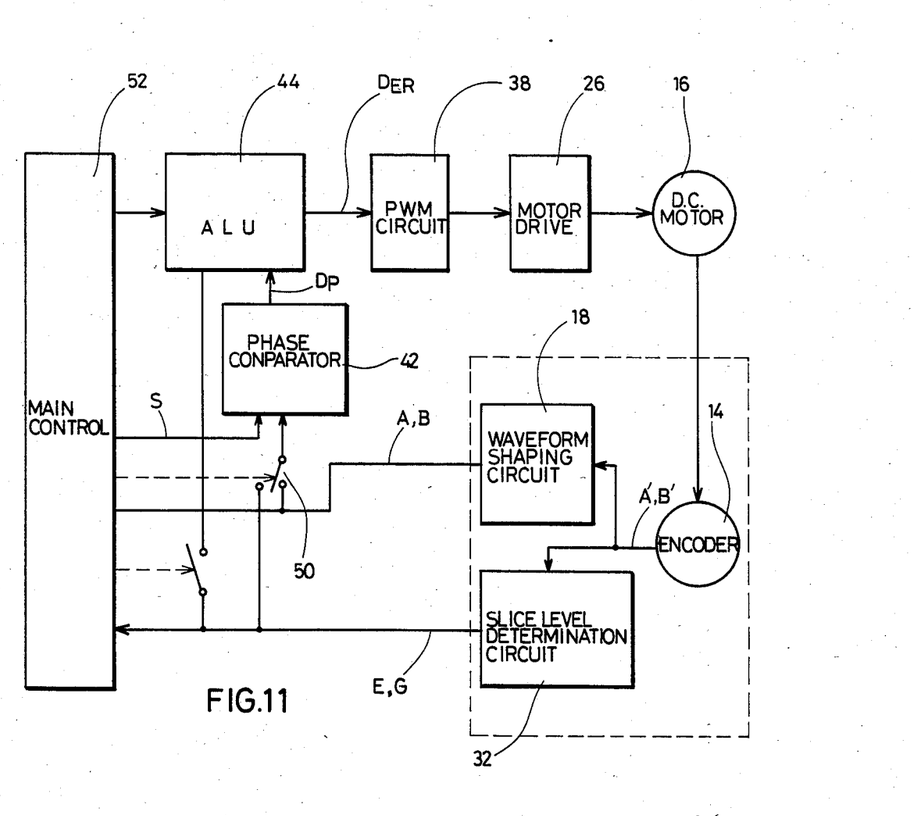
FIG. 11 is a block diagram of a further embodiment of a D.C. motor position control system of the present invention.

FIG. 11 shows a further embodiment of a D.C. motor position control system of the present invention. Like elements corresponding to those of FIG. 8 are indicated by like numerals.

In this embodiment, the sliced position indicating, digital signal E, G is used to control the system operation. The embodiment of FIG. 11 includes a switching element 50 for selectively applying the rectangular position indicating, digital signal A, B and the sliced position indicating, digital signal E, G to the phase comparator 42 in the speed detection mode. A main control circuit 52 develops a first control signal in the speed detection mode in order to supply the rectangular position indicating, digital signal A or B when the motor rotates at a fast speed. The main control circuit 52 develops a second control signal in the speed detection mode in order to supply the sliced position indicating, digital signal E or G when the motor rotates at a lower speed.

The invention being thus described, it will be obvious that the same may be varied in many ways. Such variations are not to be regarded as a departure from the spirit and acope of the invention, and all such modifications are intended to be included within the scope of the following claims.

What is claimed is:

1. A position control system for a D.C. motor comprising:
   rotary encoder means for developing an approximate sinusoidal position indicating analog signal in response to the rotation of a D.C. motor;
   slice level determination means for developing first and second sliced position indicating digital signals from said approximate sinusoidal position indicating analog signal;
   logic control means for determining the position of the D.C. motor and the rotating direction of the D.C. motor in response to said first and second sliced position indicating digital signals developed from said slice level determination means; and
   motor drive means for activating said D.C. motor in response to the determination conducted by said logic control means;
   said slice level determination means comprising,
      means for comparing said sinusoidal position indicating analog signal with a plurality of discrete voltages to develop a plurality of voltage attainment outputs, each representing that said sinusoidal position indicating analog signal has exceeded a said discrete voltage, and
      means for combining said voltage attainment outputs to produce said first and second sliced position indicating digital signals, said first and second sliced position indicating digital signals comprising pulse signals; said logic control means comprising,
      an up/down counter for developing coarse position signals for determining coarse position from said first and second sliced position indicating digital signals, and
      sliced position detection means for determining the position of said motor from said coarse position signals and said first and second sliced position indicating digital signals.

2. The position control system for a D.C. motor of claim 1, wherein said slice level determination means divides the voltage level of said approximate sinusoidal position indicating analog signal into 16 (sixteen) discrete voltages, thereby developing said first and second sliced position indicating digital signals.

3. The position control system for a D.C. motor of claim 1, further comprising:
   waveform shaping means for developing a rectangular position indicating digital signal in accordance with said approximate sinusoidal position indicating analog signal;
   motor speed detection means for detecting the rotating speed of said D.C. motor through the use of said rectangular position indicating digital signal developed from said waveform shaping circuit; and
   motor speed control means for maintaining the rotating speed of said D.C. motor at a desired value with reference to said rotating speed of said D.C. motor detected by said motor speed detection means.

4. A position control system for a D.C. motor comprising:
   a rotary encoder associated with a D.C. motor, said rotary encoder developing an approximate sinusoidal position indicating analog signal in response to the rotation of the D.C. motor;
   a waveform shaping circuit connected to receive said approximate sinusoidal position indicating analog signal from said rotary encoder, and developing a rectangular position indicating digital signal;
   a main control circuit which develops a speed instructing pulse signal;
   a phase comparator which receives said rectangular position indicating digital signal and said speed instructing pulse signal from said waveform shaping circuit and said main control circuit, respectively, and develops a digital code signal representative of the phase difference between said rectangular position indicating digital signal and said speed instructing pulse signal;

motor speed control means for maintaining the rotating speed of said D.C. motor at a desired value with reference to said digital code signal developed from said phase comparator;

a slice level determination circuit which receives said approximate sinusoidal position indicating analog signal developed from said rotary encoder, and develops a sliced position indicating digital signal;

a logic circuit which determines the position of the D.C. motor and the rotating direction of the D.C. motor in response to said sliced position indicating digital signal developed from said slice level determination circuit; and motor hold control means for holding said D.C. motor at a desired position in response to the determination conducted by said logic circuit.

5. The position control system for a D.C. motor of claim 4, said slice level determination circuit including:

a plurality of voltage comparators which, in combination, divide the voltage level of said approximate sinusoidal position indicating analog signal into a plurality of sliced levels;

a first set of exclusive-OR gates each of said set of exclusive-OR gates receiving output signals from two voltage comparators of succeeding odd numbers;

a second set of exclusive-OR gates each of said set of exclusive-OR gates receiving output signals from two voltage comparators of succeeding even numbers;

a first OR gate connected to receive output signals of said first set of exclusive-OR gates, and developing a first sliced position indicating digital signal; and a second OR gate connected to receive output signals of said second set of exclusive-OR gates, and developing a second sliced position indicating digital signal.

* * * * *